(12) United States Patent
Nakajima et al.

(10) Patent No.: US 8,687,245 B2
(45) Date of Patent: Apr. 1, 2014

(54) IMAGE READING APPARATUS

(75) Inventors: Yuki Nakajima, Oogaki (JP); Yasuhiro Hosokawa, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 59 days.

(21) Appl. No.: 13/432,712

(22) Filed: Mar. 28, 2012

(65) Prior Publication Data

US 2012/0268801 A1  Oct. 25, 2012

(30) Foreign Application Priority Data

Apr. 19, 2011 (JP) ................................. 2011-093227

(51) Int. Cl.
*H04N 1/04* (2006.01)

(52) U.S. Cl.
USPC ............ 358/474; 358/497; 358/498; 358/496

(58) Field of Classification Search
USPC .......................... 358/474, 497, 498, 496, 505
See application file for complete search history.

(56) References Cited

U.S. PATENT DOCUMENTS

| | | | | |
|---|---|---|---|---|
| 6,081,351 A * | 6/2000 | Tabata | ........................... | 358/475 |
| 6,724,503 B1 | 4/2004 | Sako et al. | | |
| 6,892,945 B2 | 5/2005 | Shishido | | |
| 7,136,203 B2 * | 11/2006 | Yokota et al. | .................. | 358/484 |
| 7,639,404 B2 * | 12/2009 | Ikeno et al. | .................... | 358/461 |
| 8,253,986 B2 | 8/2012 | Ikeno et al. | | |
| 2003/0081275 A1 | 5/2003 | Shishido | | |
| 2006/0023267 A1 | 2/2006 | Ikeno et al. | | |
| 2008/0198426 A1 | 8/2008 | Yokochi | | |
| 2010/0060954 A1 | 3/2010 | Ikeno et al. | | |
| 2010/0277776 A1 | 11/2010 | Osakabe | | |
| 2011/0075229 A1 | 3/2011 | Fujiwara | | |
| 2012/0268801 A1 | 10/2012 | Nakajima et al. | | |
| 2012/0281260 A1 | 11/2012 | Ikeno et al. | | |

FOREIGN PATENT DOCUMENTS

| | | |
|---|---|---|
| EP | 1622354 A2 | 2/2006 |
| EP | 1622354 A3 | 4/2006 |
| JP | 10-013636 | 1/1998 |
| JP | 11-074497 | 3/1999 |
| JP | 2003-134307 | 5/2003 |
| JP | 2012-227710 A | 11/2012 |

OTHER PUBLICATIONS

Search Report and Search Opinion issued in related European Application No. 12162086.8 mailed May 14, 2013.

* cited by examiner

*Primary Examiner* — Houshang Safaipour
(74) *Attorney, Agent, or Firm* — Banner & Witcoff, Ltd.

(57) ABSTRACT

An image reading apparatus is provided. The image reading apparatus includes a first transparent section to have a first original sheet set thereon, a second transparent section to have a second original sheet conveyed by a sheet conveyer, a reader unit being movable in a sub-scanning direction to read the image on the original sheet being set on the first transparent section and to be maintained still to read the image being conveyed by the sheet conveyer, a white reference member, of which image is read by the reader unit and recognized as a reference white color, and a light reductive member arranged on an inner bottom of a casing to reduce an amount of incident light.

11 Claims, 4 Drawing Sheets

IMAGE READING APPARATUS

CROSS REFERENCE TO RELATED APPLICATION

This application claims priority from Japanese Patent Application No. 2011-093227, filed on Apr. 19, 2011, the entire subject matter of which is incorporated herein by reference.

BACKGROUND

1. Technical Field

An aspect of the present invention relates to an image reading apparatus.

2. Related Art

An image reading apparatus, which is equipped with a one-dimensional image sensor, to read an original image appearing on an original sheet, such as an image scanner, a facsimile machine, and a multifunction peripheral device, is known.

In an image reading operation in the image reading apparatus, a process called shading correction is performed prior to actually reading the original image by the image sensor. In the shading correction process, the image sensor reads a reference image (e.g., a solid white image), which is to be recognized as an image with even luminosity, and corrects unevenness of the luminance, if recognized any, amongst pixels contained in the reference image.

When the image reading apparatus is exposed to intense external light such as natural sunlight, the intense light may pass through or may be reflected on parts of the image reading apparatus, and light receiving elements in the image sensor may be exposed to sense the transmissive or reflecting light. Thus, with the interference of the incident light, the uneven shading in the image sensor may not suitably be corrected.

In order to reduce the influence of the incident light, a light-blocking upright bulkhead may be arranged in the image reading apparatus in a vicinity of the image sensor. For example, the light-blocking bulkhead may be arranged in a bottom area of a casing accommodating an optical unit in the image reading apparatus whilst the external light may enter through a part of a platen glass, on which no original sheet is placed.

SUMMARY

Although the bulkhead may reduce the incident light to some extent, it may be difficult to provide the bulkhead in a most suitable position to substantially block the incident light in fine consideration of a plurality of conditions such as incident positions of the external light, available positions in the bottom of the casing, and available positions of the image sensor. Further, whilst the image reading apparatus may often have movable parts, it may be difficult to arrange the bulkhead in the suitable position to avoid the movable parts and block the incident light simultaneously.

Furthermore, even when the position to arrange the bulkhead is available, whilst height of the bulkhead may depend on the position of the image sensor and angles of the incident light, it may be necessary to increase height of the bulkhead to substantially block the incident light. When the higher bulkhead is provided, entire height of the image reading apparatus may also be increased, and an entire volume of the image reading apparatus may be undesirably increased.

In view of the difficulties, the present invention is advantageous in that an image reading apparatus, in which the image sensor can be blocked from the incident light without providing the bulkhead with the substantial height, is provided.

According to an aspect of the present invention, an image reading apparatus is provided. The image reading apparatus includes a first transparent section, which is made of a transparent material and is configured to have a first original sheet set on an upper surface thereof, a second transparent section, which is made of a transparent material and is configured to have a second original sheet conveyed by a sheet conveyer to be in contact with an upper surface thereof and to pass over the upper surface, a reader unit, which includes a plurality of light receiving elements arranged along a main scanning direction; configured to be movable in a sub-scanning direction being orthogonal with respect to the main scanning direction; configured to be moved in a lower area with respect to the first transparent section in the sub-scanning direction along the first transparent section to read an image formed on the first original sheet being set on the upper surface of the first transparent section; and configured to be maintained still in a lower area with respect to the second transparent section to read the image formed on the second original sheet being conveyed by the sheet conveyer, a white reference member, which is arranged in an image readable position for the reader unit to read an image of the white reference member, the image of the white reference member read by the reader unit being recognized as a reference white color, a light reductive member, which is arranged on an inner bottom of a casing accommodating the reader unit and configured to reduce an amount of incident light to be reflected on the inner bottom of the casing and to be directed to irradiate the reader unit. The light reductive member reduces the amount of incident light, when the incident light passes through the second transparent section and reaches the inner bottom of the casing whilst the reader unit is in the image readable position.

BRIEF DESCRIPTION OF THE ACCOMPANYING DRAWINGS

FIG. 1A is a perspective external view of the MFP according to the embodiment of the present invention with the openable tray being in an open position.

DETAILED DESCRIPTION

Hereinafter, an MFP 1 with an image scanner unit according to an embodiment of the present invention will be described with reference to the accompanying drawings.

Overall Configuration of the MFP

Figure 1A:
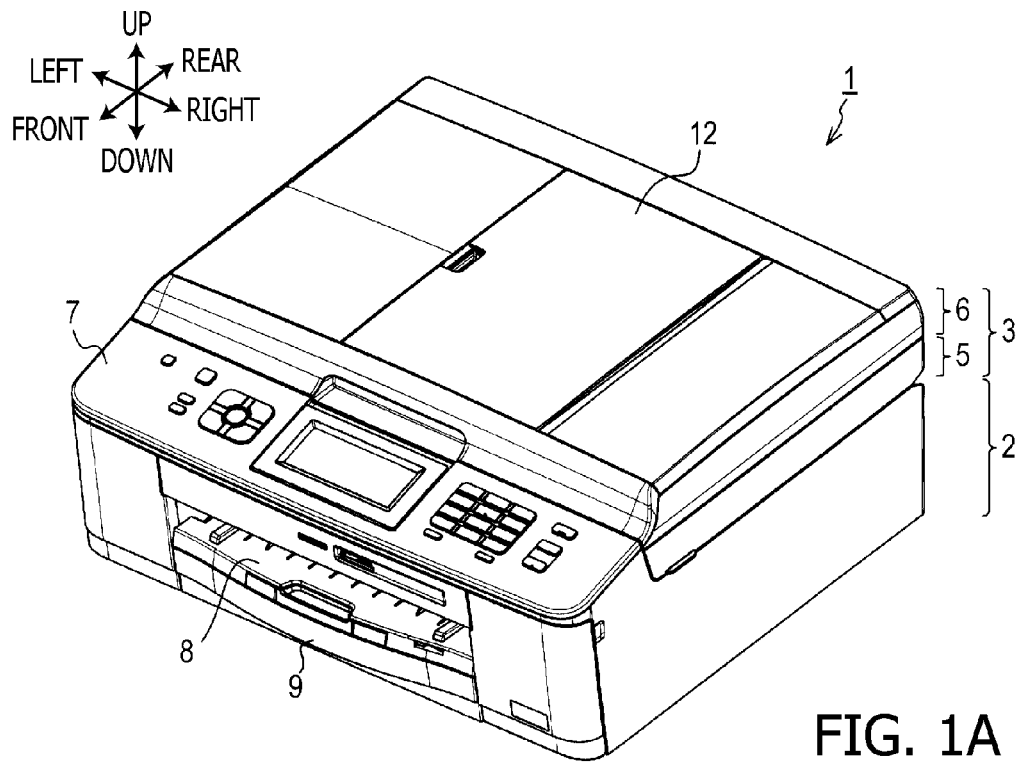
FIG. 1A is a perspective external view of an MFP according to an embodiment of the present invention with an openable tray being in a closed position.
Figure 1B:
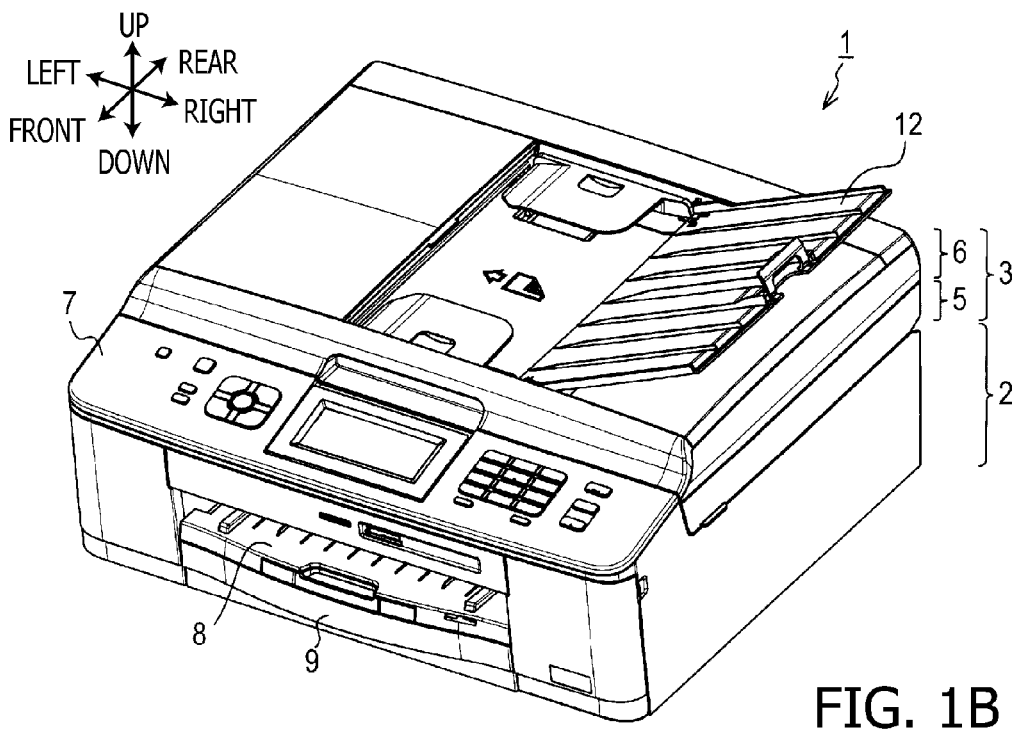

In the present embodiment described below, directions concerning the MFP 1 will be referred to based on a user's position to ordinary use the MFP 1 and as indicated by arrows shown in FIGS. 1A and 1B. Therefore, according to FIGS. 1A and AB, a viewer's lower-left side is referred to as the user's front, and a viewer's upper-right side is referred to as the user's rear. A viewer's upper-left side is referred to as the user's left, and a viewer's lower-right is referred to as the user's right. Further, the user's front-rear direction of the MFP 1 may also be referred to as a direction of depth, and the user's lateral (right-left) direction of the MFP 1 may also be referred to as a widthwise direction. The up-down direction appearing in FIG. 1 may also be referred to as a vertical direction.

The MFP 1 has a printer unit 2 and an image scanner unit 3 which is arranged in an upper position with respect to the printer unit 2. The image scanner unit 3 is a flatbed-typed image scanner with a cover being an automatic document feeder (ADF) and includes an image scanner 5 in a lower section and an ADF 6 in an upper section.

On an upper front face of the printer unit 2, an operation panel 7 is provided. The operation panel 7 is touched and operated by the user to enter instructions and information concerning operations in the MFP 1. On a front face, in a lower position with respect to the operation panel 7, a discharge outlet 8, through which recording sheets with images printed thereon are discharged, is formed. Through a lower area with respect to the discharge outlet 8 on the front face, a sheet-cassette 9 is removably installed in the MFP 1. The sheet-feed cassette 9 contains unused recording sheets being recording media therein in a stack.

The image scanner unit 3 arranged on top of the printer unit 2 is pivotable with respect to the printer unit 2 about an axis, which extends at a rear end of the image scanner unit 3 along the widthwise direction. Along with pivoting movement, the image scanner unit 3 can move between a closed position (see FIGS. 1A and 1B) to cover an upper opening (not shown) of the printer unit 2 and an open position (not shown) to expose the upper opening of the printer unit 2.

The ADF 6 is pivotable with respect to the image scanner 5 about an axis, which extends at a rear end of the ADF 6 along the widthwise direction, Along with pivoting movement, the ADF 6 can move between a closed position (see FIGS. 1A and 1B) to cover a platen glass 13 (see FIG. 2), which is provided on top of the image scanner 5, and an open position (not shown) to expose the platen glass 13.

Figure 2:
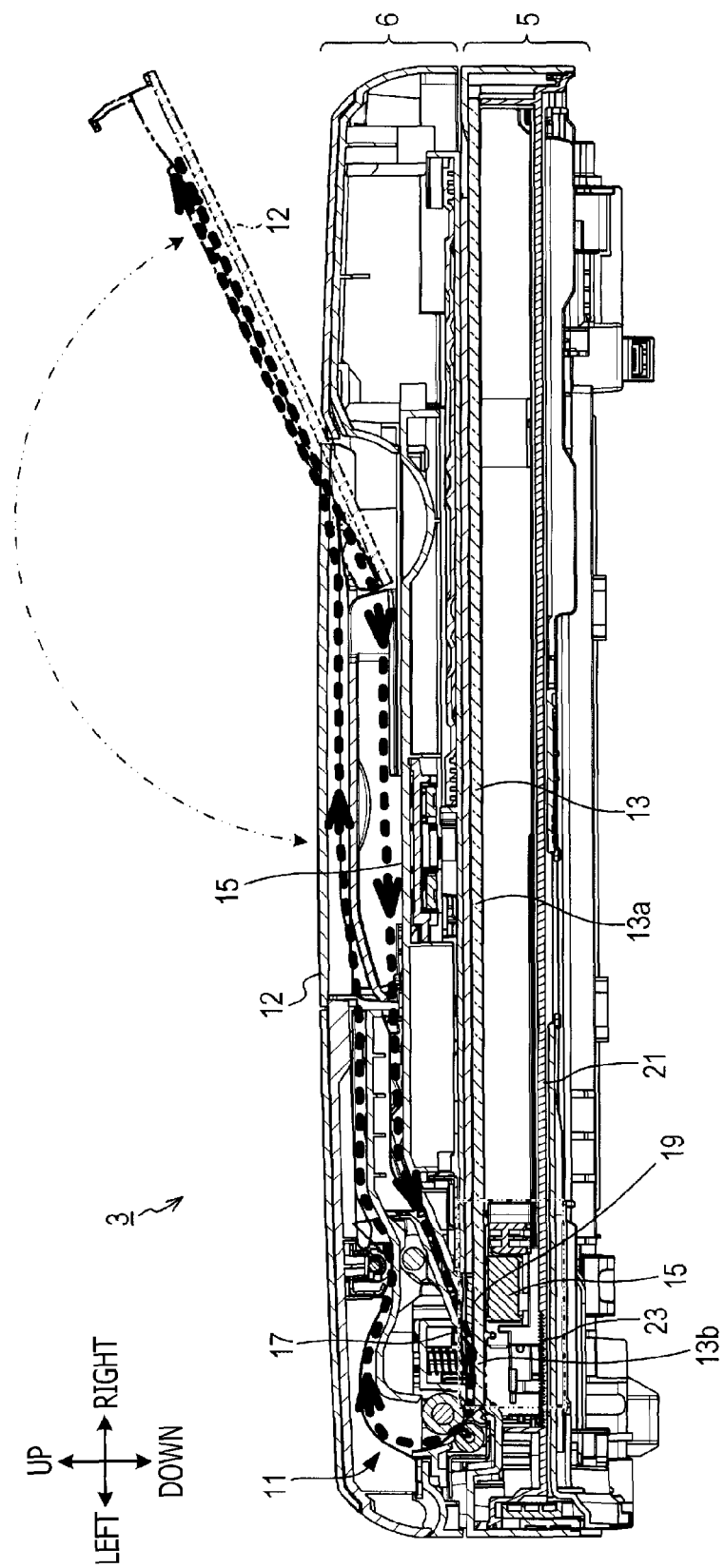
FIG. 2 is a cross-sectional side view of an image scanner unit in the MFP according to the embodiment of the present invention.

The ADF 6 is equipped with an original sheet conveyer 11 (see FIG. 2) to carry an original sheet with the original image to be read in a sheet conveyer path, which is indicated in a thick broken arrow shown in FIG. 2. The original sheet conveyer 11 includes a plurality of driving rollers and pinch rollers, which are not shown, to pinch the recording sheet in there-between. The driving rollers are rotated by driving force supplied from a drive source (not shown), and the pinch rollers are driven along with the rotation of the driving rollers with or without the recording sheet nipped in there-between.

The ADF 6 has an openable tray 12 in a top central position. The openable tray 12 is rotatable about an axis, which is one of widthwise edge (e.g., a right-side edge when the openable tray 12 is in a closed position; see FIG. 1A) extending in the direction of depth, as indicated by a double-dotted arrow shown in FIG. 2.

When the openable tray 12 is in the closed position (see FIG. 1A), the openable tray 12 is laid horizontally to form a top surface of the ADF 6 and covers a top opening formed in the top section in the ADF 6. When the openable tray 12 is in an open position (see FIG. 1B), the openable tray 12 serves as an original sheet tray, on which the original sheet to be conveyed in the ADF 6 is placed, and also as a discharge tray, on which the original sheet having been read in the ADF 6 is discharged.

In a top section of the image scanner 5, a platen glass 13 (FIG. 2) is provided. The platen glass 13 includes a first transparent section 13$a$, which serves as the platen, on which the original sheet with the original image to be read is placed, for the flatbed-typed image scanner. The platen glass 13 further includes a second transparent section 13$b$, over which the original sheet being carried by the original sheet conveyer 11 is directed to pass. The original sheet being conveyed over the second transparent section 13$b$ of the platen glass 13 is urged against an upper surface of the platen glass 13 by an original sheet holder 17, which is arranged in an upper position with respect to the second transparent position 13$b$ across the sheet conveyer path.

In the image scanner 5, in a lower area with respect to the platen glass 13, an image sensor 15 (e.g., a contact image sensor) is provided. The image sensor 15 is formed to extend in the direction of depth, which is thus a main scanning direction, and is movable in the widthwise direction, which is a sub-scanning direction. The image sensor 15 is equipped with a plurality of light receiving elements (not shown), which are arranged along the main scanning direction, to read the original image.

When the original image on the original sheet being placed on the upper surface of the first transparent section 13$a$ of the platen glass 13 is read, the image sensor 15 moves in the lower area with respect to the first transparent section 13$a$ in the sub-scanning direction along the lower surface of the first transparent section 13$a$ and sequentially read the original image appearing on the original sheet.

When the original image on the original sheet being carried in the sheet conveyer path by the original sheet conveyer 11 is read, the image sensor 15 is maintained still in the lower area with respect to the second transparent section 13$b$. Thus, whilst the original sheet passes over the upper surface of the platen glass 13, the image sensor 15 reads the image appearing on the original sheet being in contact with the upper surface of the platen glass 13.

Light Reductive Member

In an upper position with respect to a boundary area between the first transparent section 13$a$ and the second transparent section 13$b$, a white reference piece 19, of which image is to be read by the image sensor 15 upon shading correction, is provided. Meanwhile, on an inner bottom in a casing 21 of the image scanner 5, which accommodates the image sensor 15, a light reductive member 23 is provided. The light reductive member 23 will be described hereinbelow.

Figure 3A:
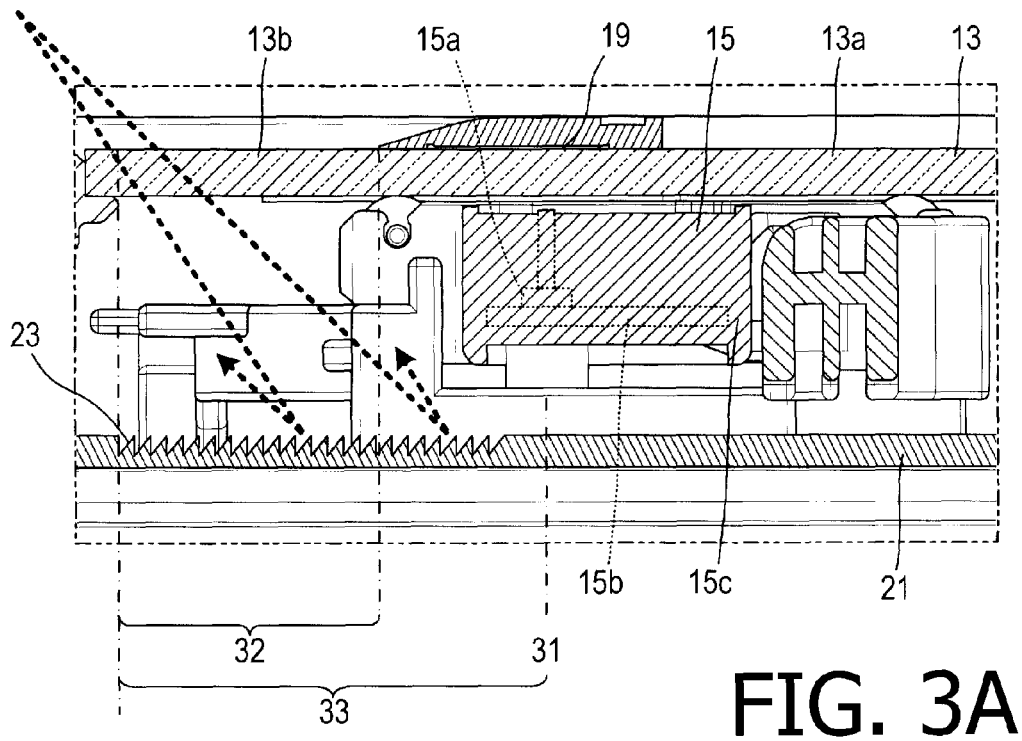
FIG. 3A is an enlarged cross-sectional partial view of an image scanner in the MFP according to the embodiment of the present invention with a jag-edged light reductive member arranged on an inner bottom.

The light reductive member 23 is formed integrally with a bottom plane of the casing 21 (see FIG. 3A). The light reductive member 23 is formed to have a plurality of grooves, which extend along the front-rear direction, on the inner bottom of the casing 21. In the present embodiment, the plurality of grooves have cross-sectional shapes of saw-teeth when viewed in the extending direction of the grooves, i.e., in the front-rear direction.

The light reductive member 23 is formed to be at least partially included in an area 33, which ranges between a first position 31 and a second position 32. The first position 31 is a directly below position with respect to a light receiving element 15$a$ in the image sensor 15 when the image sensor 15 is in an image readable position (see FIG. 3A) to read the image of the white reference piece 19. The second position 32 is a directly below position with respect to the second transparent section 13b. In this regard, the area 33 between the first position 31 and the second position 32 may include the first position 31 and the second position. In an area, which is further from the image sensor 15 with respect to the second position 32 along the widthwise direction, the light reductive member 23 may not necessarily be formed but may be absent.

With the light receiving member 23, the external light entering through the second transparent section 13b is reflected on the jagged edges of the light reductive member 23, which are formed on the inner bottom of the casing 21 of the image scanner 5, to be directed in different directions from the image sensor 15. The light paths of the entering light are shown in thicker broken arrows in FIG. 3A.

The external light may enter the casing 21 through the second transparent section 13b when, for example, a book with an open page being an original sheet is placed on top of the first transparent section 13a to be scanned with the ADF 6 being open. Even with the ADF 6 being open, with the light reductive member 23, the incident light is reflected on the light reductive member 23 to be diffused in the directions, which are different from the side of the image sensor 15.

Figure 3B:
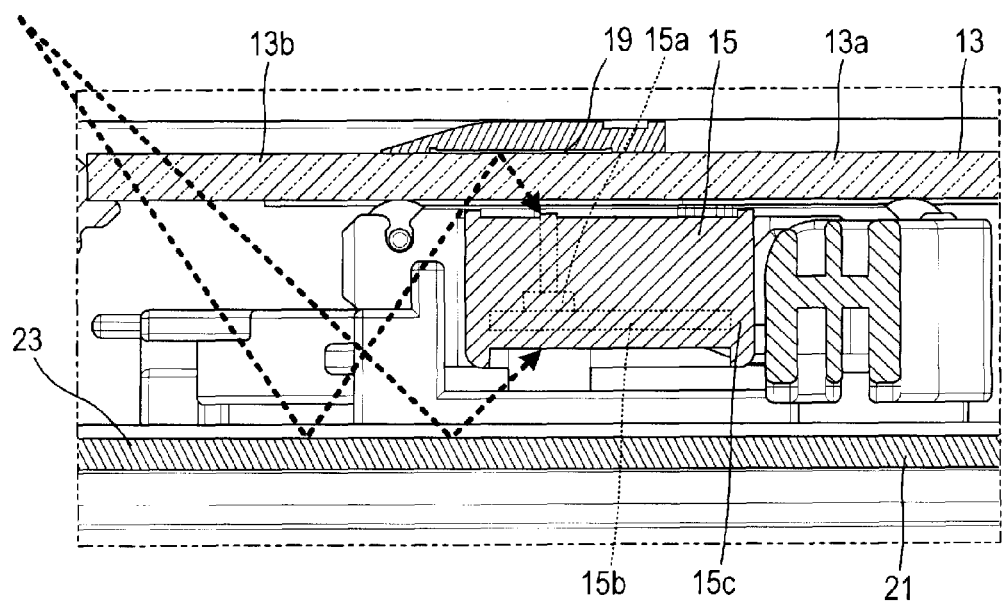
FIG. 3B is an enlarged cross-sectional partial view of an image scanner in an MFP without the light reductive member.

If the light reductive member 23 is not provided, the incident light through the second transparent section 13b reaching the inner bottom of the casing 21 of the image scanner 5 may be reflected to be directed to the image sensor 15 (see FIG. 3B). The light paths for assumable incident light are indicated in thicker broken arrows in FIG. 3B. It is to be noted that the light reflected on the inner bottom may enter and irradiate the light receiving element 15a from various directions.

More specifically, whilst the light receiving element 15a in the image sensor 15 may be arranged on a print circuit substrate 15b, the reflected light entering from above may be detected by the light receiving element 15a.

Moreover, the reflected light entering from below may even pass through the print circuit substrate 15b depending on a material of the print circuit substrate 15b or if the print circuit substrate 15b is not thick enough. Thus, the light entering from below may also be detected by the light receiving element 15a.

In particular, in order to reduce height of the MFP 1, the image sensor 15 may be supported at edges thereof by holder pieces 15c, and a space below the print circuit substrate 15b is maintained open except for least necessary components. Therefore, a large part of a lower surface of the print circuit substrate 15b may be exposed to the open space and may be irradiated by the light from below, and the print circuit substrate 15b may easily transmit the incident light.

With the influence of the incident light, the shading correction with the white reference piece 19 may not be effectively performed, and the incorrect shading adjustment may undesirably affect quality of reading the image.

However, with the light reductive member 23 as described above, even when the incident light through the second transparent section 13b reaches the inner bottom of the casing 21 of the image scanner 5, the image sensor 15 may be prevented or restricted from being irradiated by the reflected light. Therefore, the reflected light is prevented from being detected by the light receiving element 15a in the image sensor 15, and the shading correction with the white reference member 19 may be effectively conducted.

Effects

As has been described above, with the light reductive member 23, the incident light passing through the second transparent section 13b of the platen glass 13 and reaching the inner bottom of the casing 21 is reflected by the light reductive member 23, and some of the incident light, which is unless otherwise directed to irradiate the image sensor 15, is diffused. Therefore, an amount of the light to be directed to the image sensor 15 is reduced. Thus, the incident light is restricted from being detected by the light receiving element 15a, and the influence of the incident light on the shading correction process can be reduced.

Further, whilst the light reductive member 23 is arranged on the inner bottom of the casing 21 which accommodates the image sensor 15, unlike the bulkhead with substantial height, the height of the light reductive member 23 is largely reduced. Therefore, with the light reductive member 15 as described above, the image scanner unit 3 can be effectively downsized in height, and the entire height of the MFP 1 may be downsized.

Within the structure of the MFP 1, in which the image sensor 15 is movable to the position directly below from the second transparent section 13b, it may be difficult to arrange the bulkhead with the substantial height; however, the light reductive member 23 which is smaller in height can be arranged in the position at the bottom of the casing 21 without interfering in the moving path of the image sensor 15.

Furthermore, the light reductive member 23 may be integrally formed with the casing 21 in a mold. In other words, it is not necessary to arrange a separate light reductive member in the casing 21 to assemble the MFP 1, and processes to manufacture the MFP 1 may be reduced.

More Examples

Although an example of carrying out the invention has been described, those skilled in the art will appreciate that there are numerous variations and permutations of the image reading apparatus that falls within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, the light reductive member 23 may not necessarily be formed integrally with the bottom of the casing 21 in the saw-teeth shapes as long as the incident light can be restricted at the inner bottom of the casing 21.

Figure 4A:
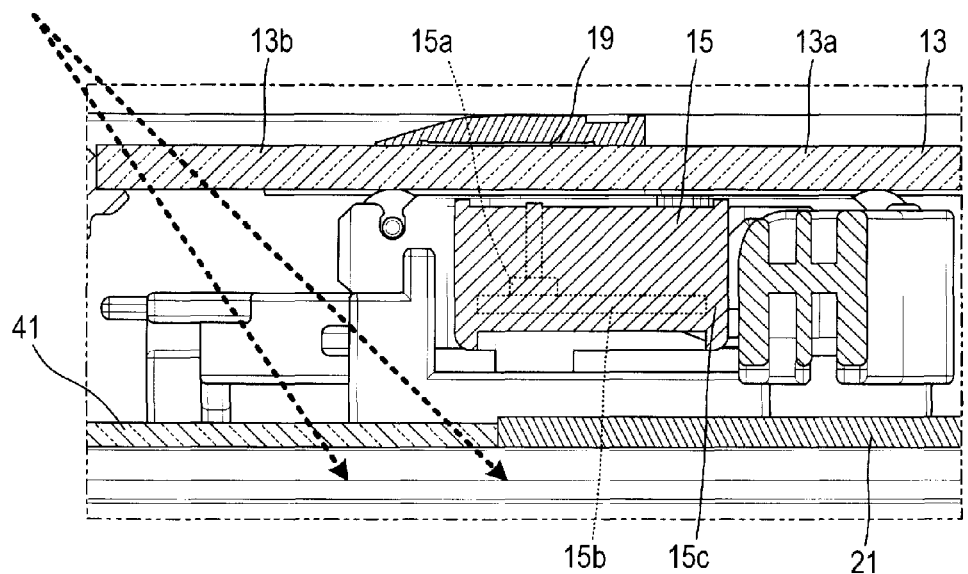
FIG. 4A is an enlarged cross-sectional partial view of the image scanner in the MFP according to the embodiment of the present invention with a permeable light reductive member arranged on the inner bottom.
Figure 4B:
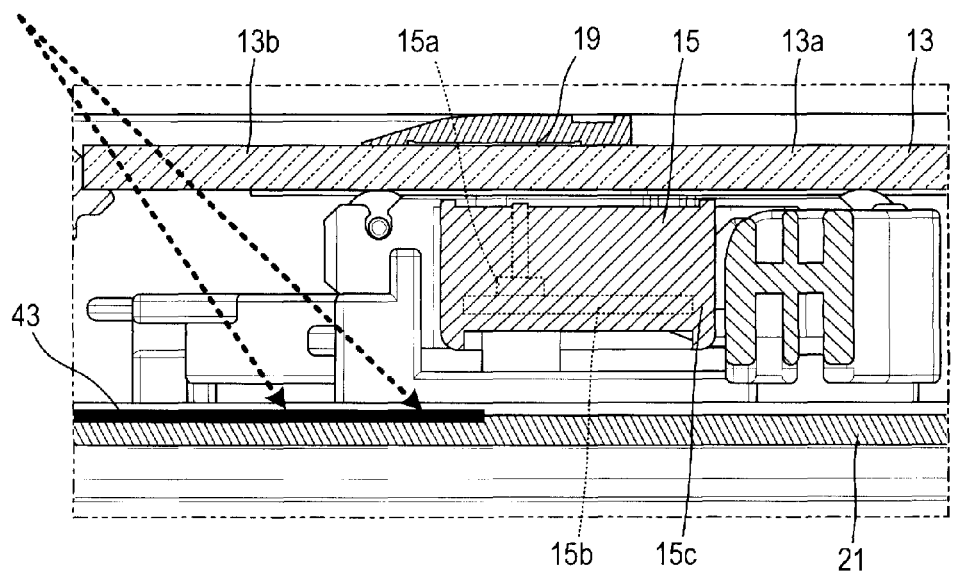
FIG. 4B is an enlarged cross-sectional partial view of the image scanner in the MFP according to the embodiment of the present invention with an absorbable light reductive member.

For example, as shown in FIG. 4A, a piece of permeable member 41 to prevent the incident light from being reflected toward the image sensor 15 may be arranged on the inner bottom of the casing 21. Alternatively, as shown in FIG. 4B, a piece of dark-colored (e.g., black) light-absorbable member 43 may be arranged on the inner bottom of the casing 21 to prevent the incident light from being reflected toward the image sensor 15.

For another example, the light reductive member 23 may be arranged to extend along the entire length of the image sensor 15, which extends in the main scanning direction. Alternatively, the light reductive member 23 may be arranged to extend partially along the image sensor 15. In particular, in the lower area with respect to the image sensor 15, if the print circuit substrate 15b is partially held to be covered by the holder pieces 15c, and the remaining uncovered part of the print circuit board 15 is exposed from the holder pieces 15c, the light reductive member 23 may be arranged in a position to specifically cover the exposed part of the print circuit board 15. When the light reductive member 23 is thus partially provided along the main scanning direction, it may not be necessary that the light reductive member 23 is provided in the positions, which are unlikely to be exposed to the incident light regardless of presence or absence of the light reductive member 23. In other words, providing the light reductive member 23 in unnecessary positions can be prevented.

For another example, the imaging device may not necessarily be the MFP 1 with a plurality of functions, but a single-functioned image scanner may be equipped with the image scanner unit 3 as described above.

What is claimed is:

1. An image reading apparatus, comprising:
a first transparent section made of a transparent material and configured to receive placement of a first original sheet on an upper surface thereof;
a second transparent section made of a transparent material and configured to receive a second original sheet, conveyed by a sheet conveyer, in contact with and passing over an upper surface thereof;
a reader unit comprising a plurality of light receiving elements arranged along a main scanning direction, the reader unit configured to be:
movable in a sub-scanning direction orthogonal to the main scanning direction;
movable in a first lower area below the first transparent section and in the sub-scanning direction along the first transparent section to read an image formed on the first original sheet received on the upper surface of the first transparent section; and
maintained in a second lower area below the second transparent section to read an image formed on the second original sheet conveyed by the sheet conveyer;
a white reference member, arranged in an image readable position where the reader unit is able to read an image of the white reference member, the image of the white reference member read by the reader unit being recognized as a reference white color;
a light reductive member arranged on an inner bottom plane of a casing accommodating the reader unit and configured to reduce an amount of incident light to be reflected on the inner bottom plane of the casing and to be directed to irradiate the reader unit,
wherein the light reductive member is configured to reduce the amount of incident light, when the incident light passes through the second transparent section and reaches the inner bottom plane of the casing while the reader unit is in the image readable position, and
wherein the light reductive member is located at a position, other than a specified position, while the reader unit is in the image readable position, wherein the specified position is located further from the reader unit than a position directly below the second transparent section.

2. The image reading apparatus according to claim 1, wherein the light reductive member is arranged to be included at least partially in an area ranging from a first position, which is directly below a light receiving element in the reader unit when the reader unit is in the image readable position, to a second position directly below the second transparent section.

3. The image reading apparatus according to claim 1, wherein the reader unit includes a substrate having a lower surface facing the inner bottom plane of the casing;
wherein the plurality of light receiving elements are arranged on an upper surface of the substrate;
wherein at least a part of the lower surface of the substrate is exposed to space in the casing; and
wherein the light reductive member is configured to reduce the amount of incident light, which is to be directed to irradiate the exposed part of the lower surface of the substrate, while the reader unit is in the image readable position.

4. The image reading apparatus according to claim 3, wherein the reader unit includes a holder configured to hold the substrate;
wherein the lower surface of the substrate is at least partially covered with the holder, and an uncovered part of the lower surface of the substrate is exposed to the space in the casing;
wherein the light reductive member is arranged along the main scanning direction in a range, in which the incident light reaching the inner bottom of the casing can be reflected thereon and directed to irradiate the exposed part of the substrate, while the reader unit is in the image readable position.

5. The image reading apparatus according to claim 1, wherein the light reductive member is formed integrally with the inner bottom plane of the casing.

6. The image reading apparatus according to claim 1, wherein the light reductive member is configured to reduce the amount of incident light by reflecting the incident light reaching the inner bottom plane of the casing in a direction other than toward the reader unit.

7. The image reading apparatus according to claim 1, wherein the light reductive member includes a light reflecting piece attached to the inner bottom of the casing, is the light reflecting piece configured to reflect the incident light reaching the inner bottom plane of the casing and direct the incident light toward a direction to prevent the reader unit from being irradiated.

8. The image reading apparatus according to claim 1, wherein the light reductive member is configured to reduce the amount of incident light by absorbing the incident light reaching the inner bottom plane of the casing thereat.

9. The image reading apparatus according to claim 1, wherein the light reductive member includes a light absorbing piece attached to the inner bottom plane of the casing, the light absorbing piece configured to absorb the incident light reaching the inner bottom of the casing.

10. The image reading apparatus according to claim 1, wherein the light reductive member is configured to reduce the amount of incident light by allowing the incident light reaching the inner bottom plane of the casing to pass therethrough.

11. The image reading apparatus according to claim 1, wherein the light reductive member is formed to have a plurality of grooves, the plurality of grooves having cross-sectional saw-tooth shapes when viewed in an extending direction of the grooves.

* * * * *